United States Patent [19]
Jullien et al.

[11] 3,797,811
[45] Mar. 19, 1974

[54] MASS EXCHANGE COLUMNS

[75] Inventors: Yves Jullien; Jean-Charles Cicile, both of Brioude, Haute-Loire, France

[73] Assignee: Societe Peur L'Equipment Des Industries Chimiques Speichim, Paris, France

[22] Filed: Aug. 25, 1971

[21] Appl. No.: 174,692

[30] Foreign Application Priority Data
Aug. 31, 1970 France .............................. 70.31649
Aug. 4, 1971 France .............................. 71.28573

[52] U.S. Cl........... 261/114 R, 137/525, 137/527.8, 261/66
[51] Int. Cl............................................. B01d 3/20
[58] Field of Search............. 261/114 R, 114 A, 66; 137/525, 527.8

[56] References Cited
UNITED STATES PATENTS
| | | | |
|---|---|---|---|
| 1,353,685 | 9/1920 | Walker | 261/114 R X |
| 1,765,087 | 6/1930 | Mase | 261/114 A UX |
| 2,290,055 | 7/1942 | Kinsey | 261/110 |
| 2,609,277 | 9/1952 | McNamara | 23/310 |
| 3,103,545 | 9/1963 | Korelitz | 261/114 R |

Primary Examiner—Dennis E. Talbert, Jr.
Attorney, Agent, or Firm—Stevens, Davis, Miller & Mosher

[57] ABSTRACT

An overflow for an exchange column of the type used in the exchange of phases having different densities. The overflow including a vertically disposed collection passage and a shut-off device adapted to automatically open in dependence of a function of the heavier phase in collection passage. The shut-off device is in one embodiment in the form of a flap valve.

2 Claims, 43 Drawing Figures

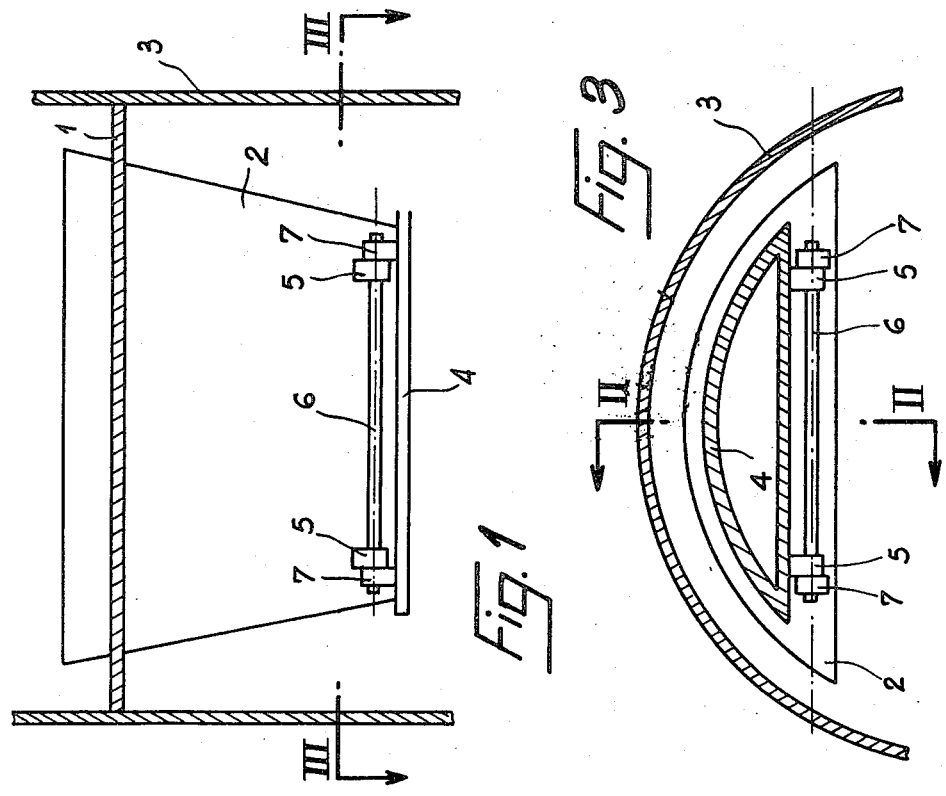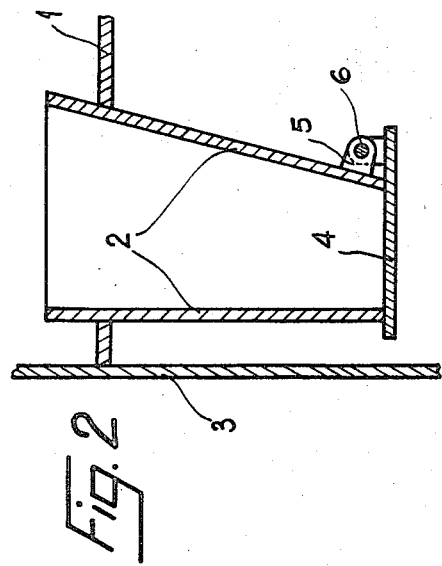

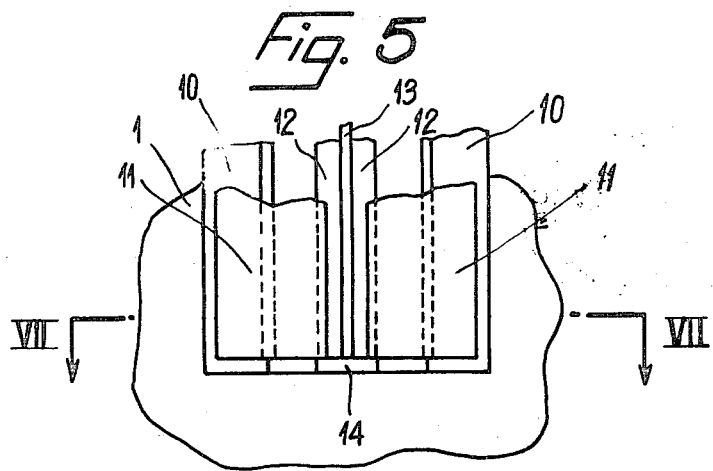
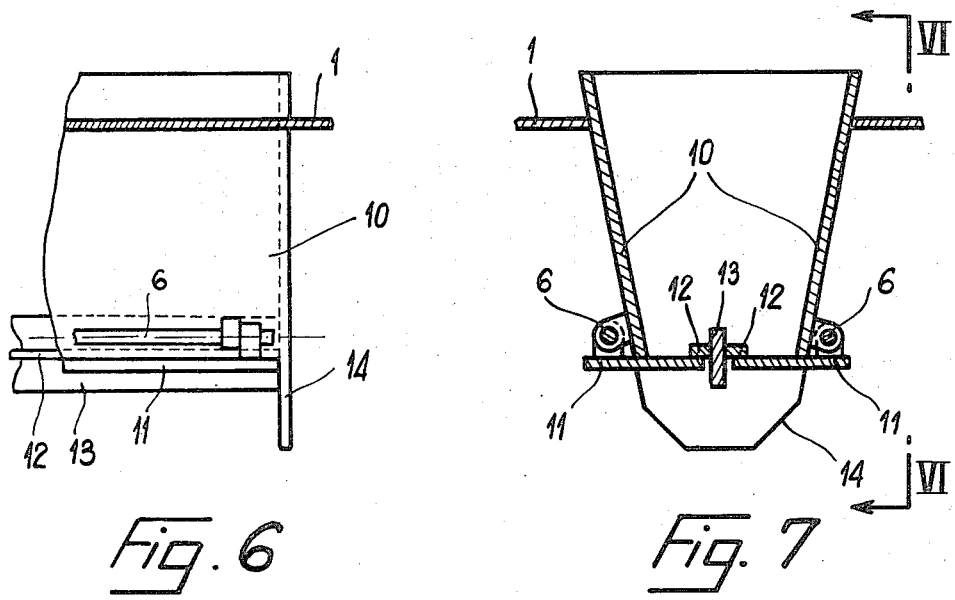

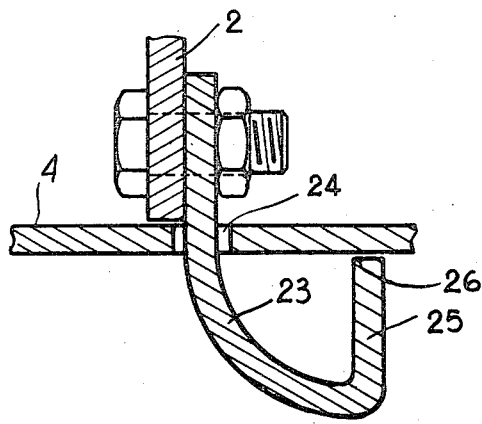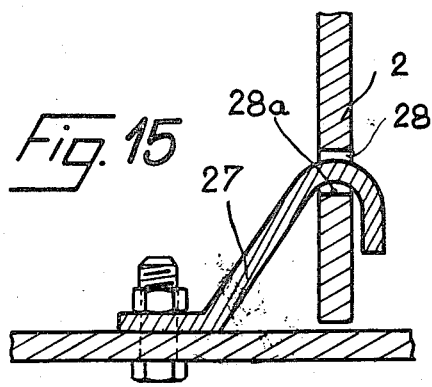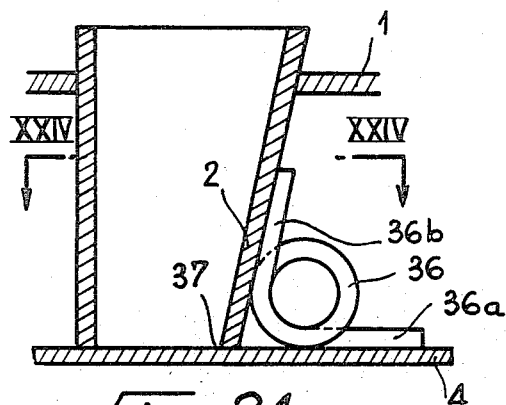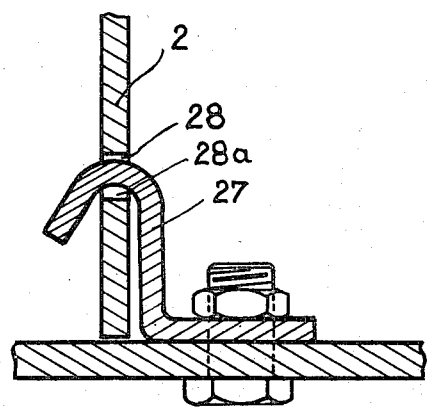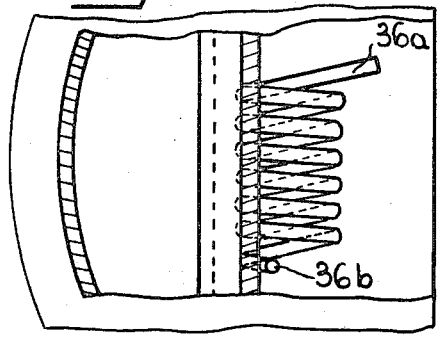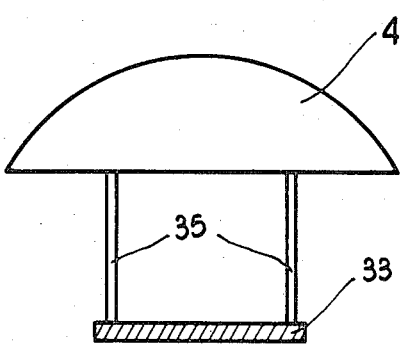

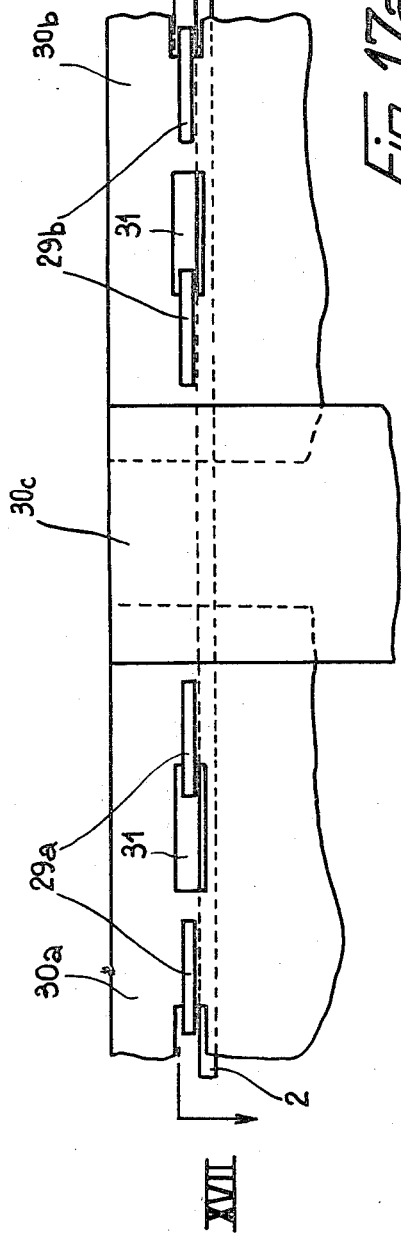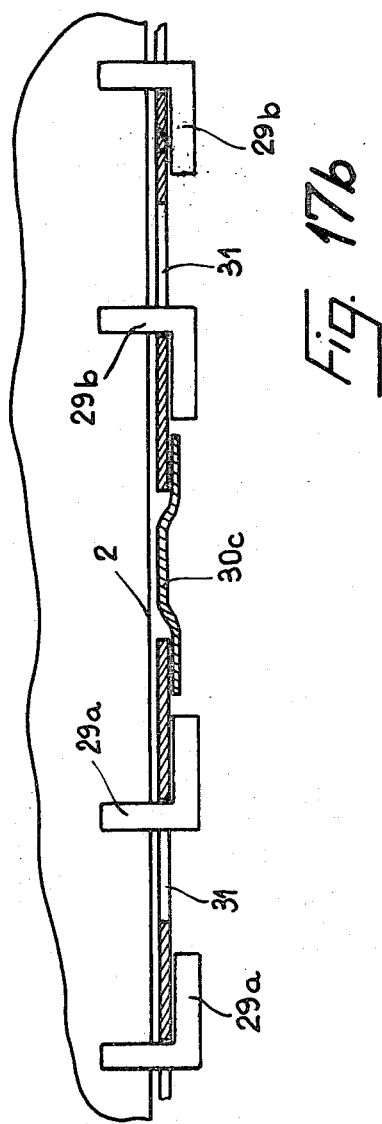

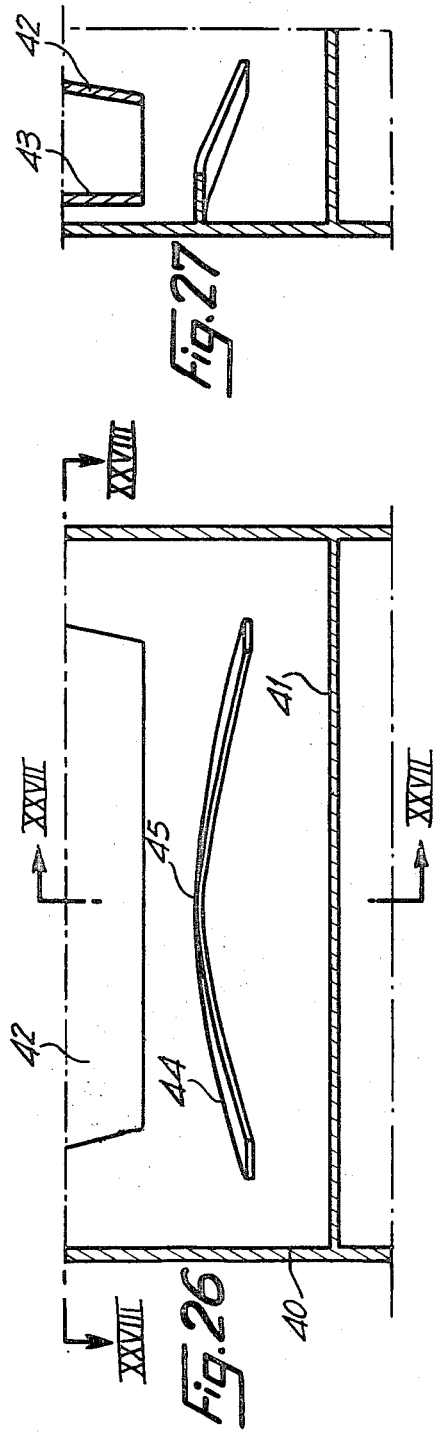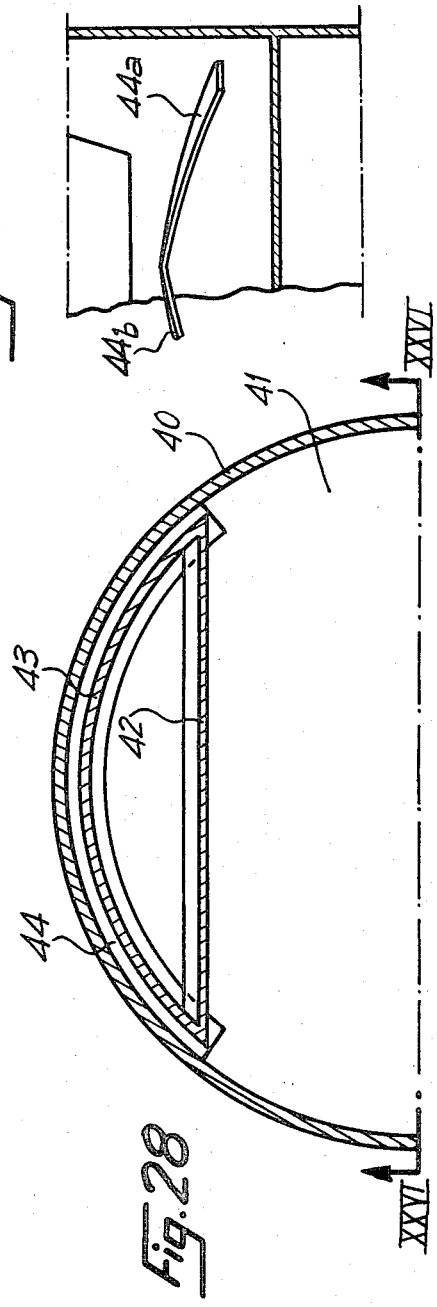

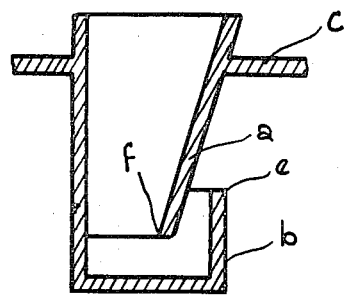
Fig. A
PRIOR ART
Fig. B
PRIOR ART
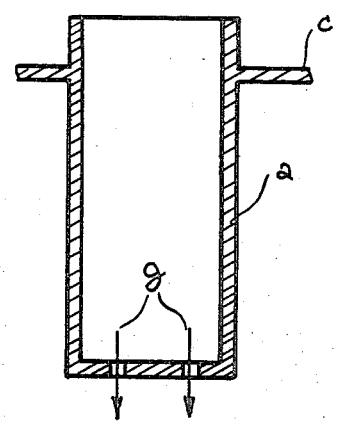
Fig. C
PRIOR ART
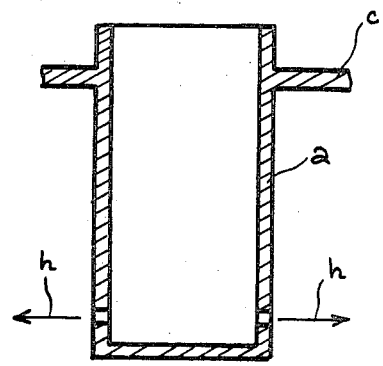

MASS EXCHANGE COLUMNS

The present invention relates to a downcomer for columns used in mass transfer processes between phases of differing density.

Three types of downcomer used for the descent of the heavier phase toward a lower tray and for distributing this heavy phase above the lower tray rather than at the level thereof are at present known, i.e., suspended cup downcomers, closed overflows having openings in the base and closed downcomers with lateral openings.

FIG. A of the accompanying drawings is a sectional, diagrammatic view of a suspended cup downcomer.

The lower edge of the downcomer opens into a protective cup b located under the tray c which carries the downcomer. The liquid is distributed by overflowing onto the lower tray d the downcomers (not shown) which are situated at 90° with respect to those of the preceding tray. A liquid seal for preventing the light phase, e.g. vapour, re-ascending into the downcomer counter-currently of the liquid is provided by the rim e which is located at a higher level than the lower edge F of the downcomer.

An downcomer of this type is described for example in United States Patent Specification No. 1,605,263 of 2nd November, 1926 in the name of Millard.

In the two other types of downcomer there is no such static seal, the seal is in fact dynamic.

FIG. B, similarly to FIG. A, is a view in section of a closed downcomer having openings in the base thereof.

The openings g in the base of the downcomer a supported by the tray c have vertical axes. They may have oriented rims for guiding the flow of the liquid.

Such an downcomer is described in United States Patent Specification No. 3,410,540 of 12th November, 1968 in the name of Walter Bruckert.

FIG. C is a sectional view of a closed downcomer with lateral openings h. Such an downcomer is described in the French Patent Specification No. 1,172,811 in the name of N.V. Bataafsche Petroleum Maatschappij.

A disadvantage of these various types of downcomer is that the cross section presented to the liquid at the base is constant. The result is a pressure drop which is expressed by the fact that the level of the liquid rises rapidly when the throughput increases, to the extent that it reaches the upper tray and the latter then becomes flooded and ceases to function.

In the downcomers having a dynamic seal a certain level of liquid in the bottom is necessary to prevent the passage of vapour. Under conditions of a low throughput part of the vapour can rise back towards the upper tray through the downcomer rather than pass through the bubbling elements of the columns; the result is reduced efficiency. It is true that one can arrange for this phenomenon to occur only for very low throughput but to this end it is necessary to reduce the cross section of the openings and then one reverts to the first mentioned drawback.

Finally, in the case of both the suspended cup downcomer and the closed downcomer with lateral ports, under conditions of strong flow the liquid is projected, under the influence of vapour flow, as far as the weir of the bottom tray without contacting the bubbling elements. Unsatisfactory operation and reduced efficiency result.

According to the present invention there is provided a downcomer for an exchange column used in mass transfer process between phases having different densities, such a downcomer including a shut-off device in the form of a flap valve normally biased towards a closed position in which material of the mass transfer process is prevented from passing from the downcomer.

In one form the flap valve is located at an outlet of the downcomer the flap valve being arranged to open the outlet when the pressure of the heavier phase present in the collection passage is at or exceeds a predetermined value and to close the outlet when the pressure of the heavier phase present in the collection passage falls below the predetermined value.

Illustrative embodiments of the invention will now be described with reference to the accompanying drawings, in which:-

FIG. 1 is a diagrammatic view in vertical section of a portion of a column having one form of lateral downcomer;

FIGS. 2 and 3 are sections respectively along the lines II—II and III—III of FIGS. 3 and 1 respectively;

FIG. 4 is a view similar to FIG. 2 but illustrates an downcomer having one wall thereof integral with the column;

FIG. 5 is a plan view from below of an downcomer separating two bubbling zones and closed by two flap valves;

FIGS. 6 and 7 are sections taken along the lines VI—VI and VII—VII of FIGS. 7 and 5 respectively;

FIGS. 14 to 16 are vertical sections showing further embodiments of the linkage of the flap valve to the wall of the downcomer;

FIG. 17a is a plan view from below of an downcomer provided with a multisectional flap valve;

FIG. 17b is a vertical section of FIG. 17a;

FIGS. 19 and 20 are plan views of flap valves with counter-weight biasing means;

FIGS. 21, 22, 23 and 24a are similar to FIG. 2, and illustrate various forms of the biasing device;

FIG. 24b is a section along the lines XXIV—XXIV of FIG. 24a;

FIG. 26 illustrates a section of the stem of a column with a lateral downcomer, taken along the lines XXVI—XXVI of FIG. 28;

FIGS. 27 and 28 are corresponding semi-sections taken along the lines XXVII—XXVII and XXVIII—XXVIII respectively of FIG. 26;

FIG. 29 is similar to FIG. 26, and illustrates a modification;

Figure 8:
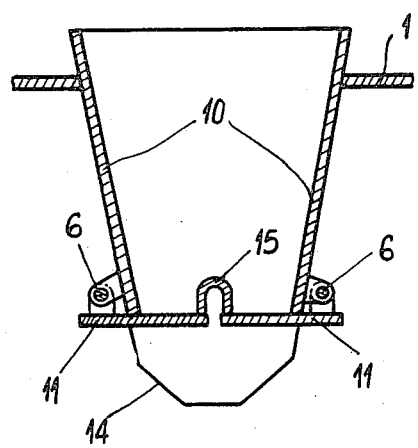
FIGS. 8 to 10, are similar views to the view of FIG. 7 and illustrates three forms of modification.

Referring now to the drawings FIGS. 1 to 3 illustrate a tray 1 of a column, e.g. a distillation column, which carries a lateral truncated downcomer 2 which is separate from the shell 3 of the column. At its lower end the downcomer is provided with a liquid supply control device in the form of a rigid flap valve 4 having a thickness of few millimetres and of a similar shape to the cross-section of the downcomer but having larger dimensions in plan.

The flap valve 4 which is articulated about an axis parallel to the lower edge of the base of the downcomer adjoins the latter and rests against the entire lower perimeter thereof. Bearings 5 secured to the lower portion of the downcomer carry a shaft 6 equipped with a device (not shown) which prevents sliding movement longitudinally of its axis. The shaft 6 is in turn received in bearings 7 integral with the flap valve 4. A biasing device (not shown) urging the flap valve 4 toward the closed position is associated with the flap valve.

FIG. 4 illustrates a tray 8 having several detachable elements (sectional trays), with the external face of the dowcomer consisting of a portion of the shell 3 of the column. In this case, the curved portion of the flap valve 4, which is mounted in a similar manner to the flap illustrated in FIGS. 1 to 3, abuts a segment 9 sealingly attached to the shell 3. Here too, as in most of the subsequent Figures, the biasing device is not illustrated.

In the preceding embodiments which relate to a in which the pivot axis of the flap valve is located on the wall most remote from the shell 3 so that the heavy phase on exiting from the downcomer is directed by the valve flap towards the shell.

When an downcomer 10 (FIGS. 5 to 7) separates two zones provided on a bubbling tray, two flap 11 pivot at each of the faces of the downcomer about a shaft 6 (not shown in FIG. 5). In the closed position the flap abut two bars 12 welded to a vertical plate 13. At the bottom of its narrow sides the downcomer is provided with an extension 14 intended to ensure relative lateral sealing for the liquid when the flap 11 open. By way of a modification (FIG. 8) the assembly of plate 13 and bars 12 may be replaced by a unit 15 of inverted U-shape.

Figure 9:
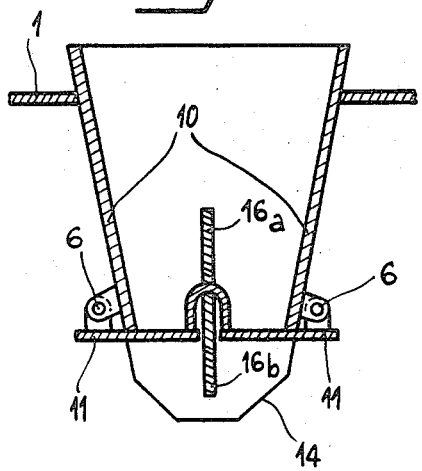

The U-shaped member 15 can be combined with a vertical plate above or below, or both above and below (plates 16a and 16b, FIG. 9) to facilitate outflow of the liquid.

Figure 10:
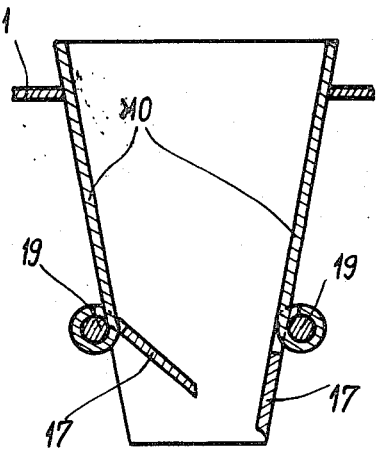
Figure 11:
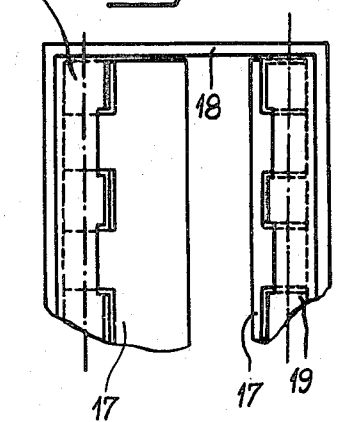
FIG. 11 is a plan view of FIG. 10.

Instead of abutting specific members the flap valves can abut one another and preferably, in a vertically sectional view of the closed position, have the appearance of two legs of a V (flaps 17 of FIGS. 10 and 11). The ends of the flaps are ensured of adequate sealing by contact with the side walls 18 of the downcomer.

Figure 12:
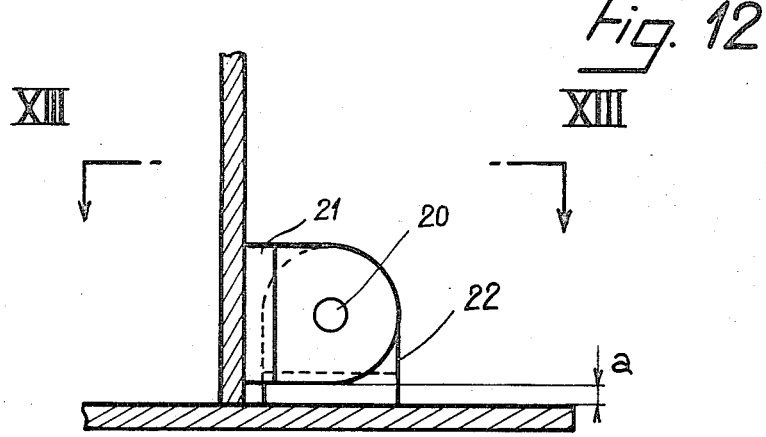
FIG. 12 is a sectional view similar to FIG. 2 and shows how the valve can be pivotably mounted on the wall of the downcomer.
Figure 13:
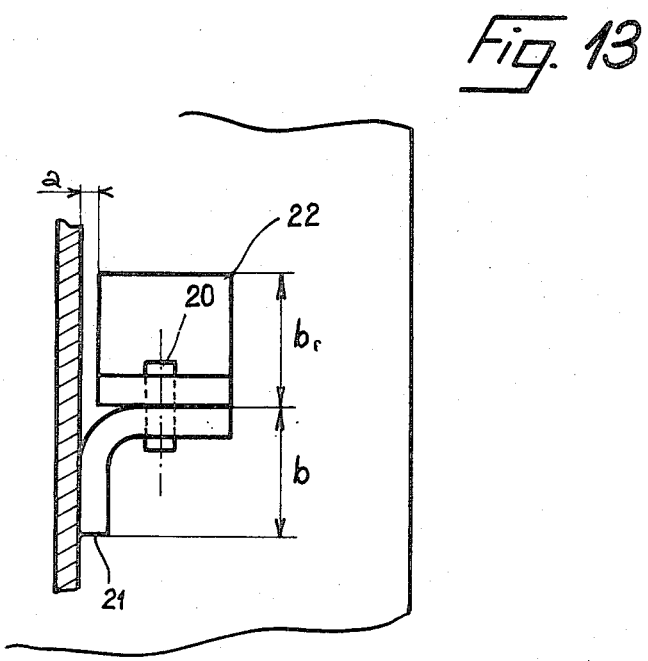
FIG. 13 is a plan view corresponding to a section along the lines XIII—XIII of FIG. 12.

The connection of the flap valve to the member carrying it, e.g. to the downcomer, can be made by any appropriate arrangement allowing the flap valve to pivot, especially by a pivot axis such as 6 and bearings such as 5 and 7 of FIGS. 1 to 3, a hinge and shaft 19 such as the one of FIGS. 10 and 11, or two (or more) assemblies such as are illustrated in FIGS. 12 and 13, each of which assemblies comprises a pivot axis 20 which is prevented from axial movement by taper pins, stop rings or equivalent means, lugs 21, e.g. of bent sheet metal, secured to the downcomer and lugs 22 secured to the valve.

FIGS. 14 to 17 illustrate brackets which represent functional equivalents of the pivot axes previously described.

These brackets may be attached by any suitable means, e.g. by bolting, to their support, for example the downcomer 2. In the case of FIG. 14 a curved portion 23 passes through a gap 24 fashioned in the flap valve 4 and ends in extremities 25 vertically removed from the outside of the downcomer. The median portion 23 is substantially in the shape of an arc of a circle the centre whereof is on the edge 26 of the extremity 25. The outer circumference is tangential to the plane of the outer surface 2 of the downcomer.

According to the modifications of FIGS. 15 and 16 the brackets are attached to the flap valve. Each bracket is in the form of a hook 27 passing through the wall of the downcomer 2 which can turn on the lower rim 28a of the orifice 28. The major portion of the bracket can be inside (FIG. 15) or outside (FIG. 16) the downcomer.

The linkage and articulation between the flap valve and the downcomer can also be made through the intermediary of two groups of L-shaped brackets 29 (FIGS. 17a and 17b) attached to the downcomer 2 or punched into the latter. The horizontal limbs of both groups of brackets are directed inwardly as can be clearly seen from FIG. 17b. The flap valve then comprises two elements 30a and 30b which are positioned by threading them from above onto the L-angles 29 via slots 31. The element 30a and 30b are then joined, by suitable means, to a third element 30c of appropriate shape, to ensure the necessary tightness of the flap valve when in closed position.

Figure 18:
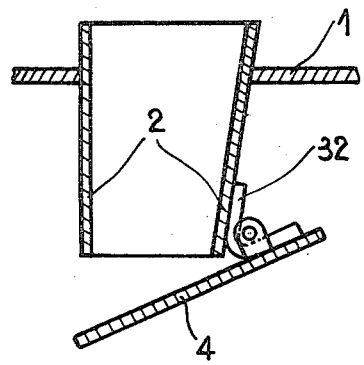
FIG. 18 is similar to FIG. 2, and shows a device for restricting the travel of a flap valve.

Limitation of travel of the flap valve 4 in any of the embodiments described can be obtained by a stop fixed by any appropriate means to the wall of the downcomer on which the pivoting occurs or to the flap valve itself; FIG. 18 shows a stop 32 in the form of an angle piece secured to the downcomer 2 and which the flap valve strikes at the end of its travel; alternatively the angle piece may be fixed to the flap valve.

Figure 21:
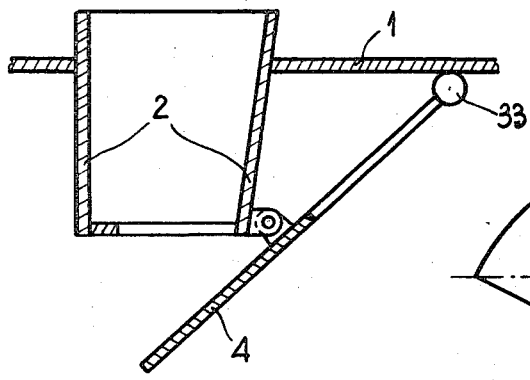
Figure 19:
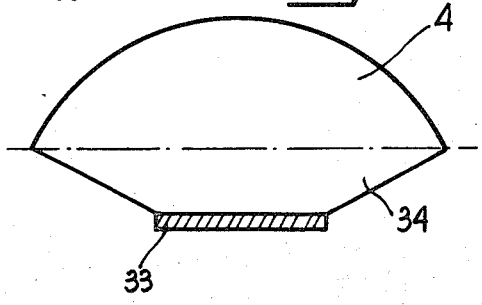
Figure 22:
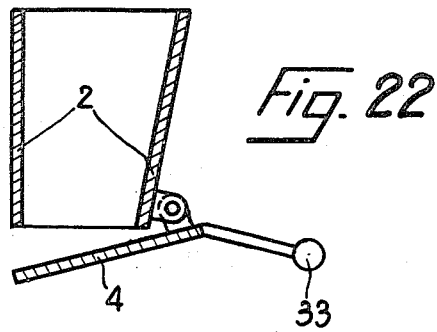

Return of the flap valve to its rest position can be ensured by the biasing device which may be in the form of a counter-weight 33 (FIG. 19) secured to an extension 34 of the flap valve at the other side of its pivot axis 5 or by equivalent means. The portion 34 may be perforated so as to permit the vapour to pass. The counter-weight 33 can also (FIG. 20) be fixed to the end of one or more rods 35 which are in turn secured to the flap valve. In the latter case the length of the rods may be chosen such that the limitation of the travel of the valve is ensured by the counter-weight abutting under the upper tray 1 (FIG. 21). Instead of being in the plane of the flap valve 4 the counter-weight 33 may be in a different plane (FIG. 22) if this proves necessary for reasons of stability.

Figure 23:
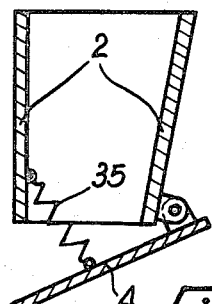

The biasing device may also be in the form of a spring. In the case of FIG. 23, for example, a helical spring 35 operates by tension; it is, for example, situated interiorly of the downcomer and one of its ends is fixed to the flap valve 4, the other end to the wall of the downcomer 2 opposite that where the flap valve is articulated (or, optionally, to the barrel). The spring may be calculated to serve also to limit the extent of opening of the flap valve.

In the case of FIGS. 24a and 24b a plurality of helical springs such as 36 has been provided. Each spring has its axis parallel to the lower edge 37 of the inner surface of the downcomer and serves simultaneously as articulation and as biasing system. One end 36a of the spring is attached to the flap valve 4, the other end 36b to the wall of the downcomer. This spring too may be calculated so as to serve to limit the travel of the flap valve. One or more such springs 36 can clearly be associated to an articulated flap valve such as the one of FIG. 12.

Figure 25:
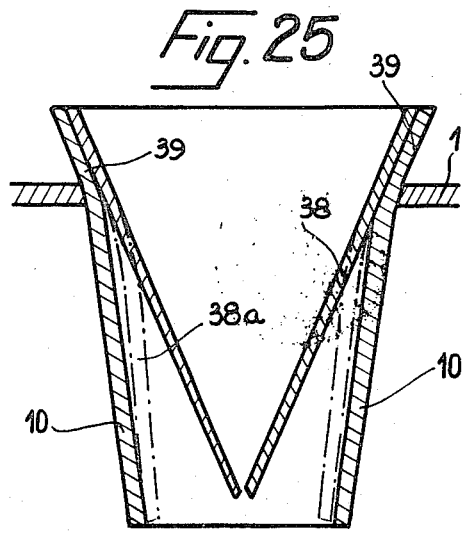
FIG. 25 is similar to FIG. 10, and illustrates flap valves made of resilient blades.

In the case of a downcomer separating two bubbling zones (FIG. 25) two flexible valve flaps 38 may be secured to the weir 39 of the tray, so that the two valve flaps come together when at rest. Under the influence of the pressure of liquid and as a result of their resilience the valve flap resiliently deform until they occupy a position such as 38a. The wall 10 of the downcomer may then be replaced by a simple frame serving as abutment for the plate 38.

The preceding Figures show downcomers of segmental or rectangular section. However the downcomer may be of any suitable section e.g. circular, ovoid or triangular.

The present downcomer may also provide means which permit the liquid throughout leaving the centre and the ends of the downcomer, when it is lateral, to be rendered uniform, as well as to reduce the vertical speed of the liquid from such an downcomer upon its arrival on the tray, which speed may be detrimental to the good functioning of perforated or valve-equipped trays by causing direct vertical passage therethrough, of a fraction of the liquid arriving at the tray.

To this end it is envisaged to mount opposite the outlet of the downcomer a jet deflector constructed and arranged in such a manner as to direct sideways excess liquid arriving at the centre.

In order to render the supply of liquid uniform one can also provide a shut-off device in the form of weighted sections so that the end sections can open prior to the median sections.

In the case of the shut-off device in the form of a flap valve articulatedly mounted on the downcomer one can prevent a jet of liquid being projected in the direction opposite to the desired direction through the space near the pivot axis opened by the flap, by providing in that region a jet deflector or deviator.

When the shut-off device consists of two symetrical flap valve intended to open in the manner of windows, it may happen that only one flap valve opens and that the issuing liquid has a tendency to flow sideways rather than to fall vertically. In order to remedy this defect one can provide each flap valve with a downwardly directed sill in the vicinity of the other flap valve.

In the case of a flap valve which is urged to the closing position by a counter-weight it suffices that the latter have, with respect to the pivot axis, a momentum slightly exceeding that of the weight of the flap valve when the flap valve is closed.

In operation of the downcomer a column of liquid is established and one can readily demonstrate that the equilibrium of the momentum requires a supplementary counter-weight the weight whereof is proportional to the weight of the liquid column, i.e., to the mass of its liquid by volume.

In a distillation column the mass by volume sometimes varies considerably from one tray to the other. For example, in a column for separating water and methanol the mass by volume changes from 0.85 to 0.90 kg/dm$^3$ from one tray to the next. The variations of regulating the column, or different utilisations of the same column over a period of years, may bring about major variations in the mass by volume of the liquid at the level of a given tray.

It is thus desirable to obtain a counter-weight weight which varies at the same rate as the mass by volume of the liquid to be treated.

To this end one can construct the counter-weight in the form of a hydraulic counter-weight having a reserve of liquid supplied by the downcomer itself. In one embodiment the reservoir can be arranged so as to be supplied by a jet of liquid projected, as mentioned above, in the direction opposite to that desired. In a variant it may alternatively be mounted in such manner as to receive a diversion of the jet of liquid projected in the desired direction.

When, as has been described with reference to FIGS. 14 to 16 for example, the flap valve is suspended from the downcomer by hooks and the pivot point is spaced apart from the lower edge of the downcomer, a parasitic jet of liquid projected in the direction opposite to the desired main direction is formed. To remedy this, in the case of suspension by hooks, the hooks can be given such a configuration and they can be attached in such a manner that the axis about which the flap valve pivots on the hook is substantially plumb with the lower edge of the downcomer and at a distance from the latter which does not exceed the thickness of the flap valve.

Referring to FIGS. 1 to 3 it can be seen that the outflow of liquid between the flap valve 4 and the lower rim of the downcomer 2 is less towards the ends of the overflow than at its centre and that the supply to the lower tray is not uniform. In a conventional downcomer one generally provides an weir which overcomes this disadvantage. Such a remedy being impracticable when the bubbling elements occupy all the space under the downcomer.

In the examples shown in FIGS. 26 to 28 the reference numeral 40 denotes the shell of a column having a tray 41 and a lateral downcomer comprising a planar wall 42 and a cylindrical wall 43. To facilitate understanding of these Figures, the flap valve, similar to that of FIG. 1 for example, is not shown. In order to direct the excess liquid from the centre to the sides of the downcomer a deflector 44 secured to the shell 40 is provided. The deflector consists of a strip of constant width tangential to a horizontal land in its middle 45 and inclining downwardly towards its ends. Its width may be between 10 and 50 percent of the maximum width of the overflow at its base (width visible in FIG. 27).

Instead of being tangential to a horizontal land this deflector may, as shown by FIG. 29, comprise two portions 44a, 44b forming a dihedral angle.

Of course, this deflector can be given other forms, for example, the deflector can be of variable width or it may be assembled at an acute or obtuse angle at the barrel (instead of the right angle shown by FIG. 27). The deflector may also be provided with bores of any shape and have a section designed to obtain a more uniform distribution of the liquid at the entry to the tray.

If the deflector is provided with orifices it may be contained in a horizontal plane or in a cone having a vertical axis and a horizontal base, since the holes themselves can correct the distribution of liquid.

Figure 30:
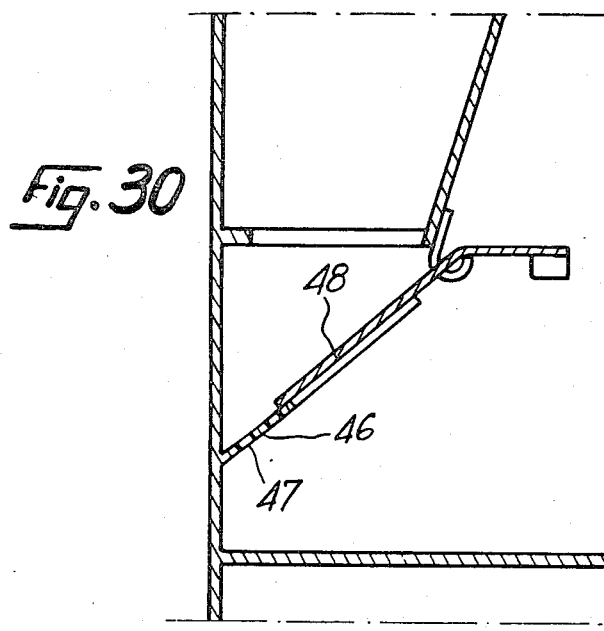
FIG. 30 is similar to FIG. 27, and illustrates a further modification.

The deflector 46 shown in FIG. 30 has the form of a crescent in a horizontal plane, of the kind of an elliptical crescent if the barrel is cylindrical, and it is provided with apertures 47. The apertures 47 are preferably distributed in such a manner that the issuing liquid is distributed substantially equally over the entire extent of this deflector.

Figure 31:
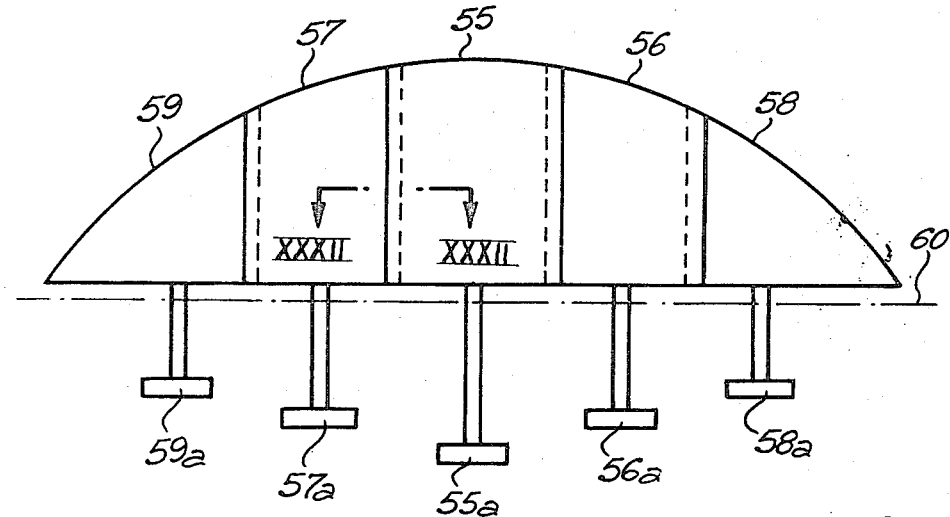
FIG. 31 is a diagrammatic plan view of an downcomer consisting of a plurality of sections.
Figure 32:
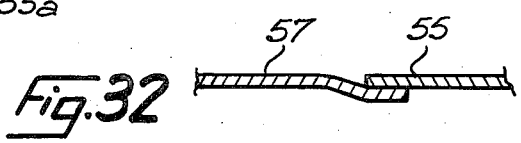
FIG. 32 is a partial transverse section along the lines XXXIII—XXXIII of FIG. 31.

The counter-weight-equipped flap valve shown in FIG. 31 is, as regards its mounting, analogous to the one of FIGS. 1 to 3 but it consists of five, preferably symetrical, sections 55, 56, 57, 58 and 59. These sections can be pivotable about different axes or about a common axis such as 60, and they have counter-weights and stops limiting the travel which are envisaged so that the end sections 58 and 59 open prior to and wider than the median sections 56 and 57 which in turn open before and wider than the central section 55. A more uniform distribution of liquid along the barrel can thus be re-established. The sections may marginally overlap as is shown in FIG. 32, or they may simply be contiguous. The counter-weights of the sections 55 to 59 are designated by the reference numerals 55a to 59a.

Referring to FIG. 30, for example, it can be seen that when the flap valve 48 opens it uncovers a passage at the side of its pivot axis. This may occur both with the lateral as with the central overflows of the trays. From this passage issues a jet of liquid which is directed towards the exit of the tray and which thus escapes an important section of the bubbling zone, which may reduce the efficacy of the tray.

Figure 33:
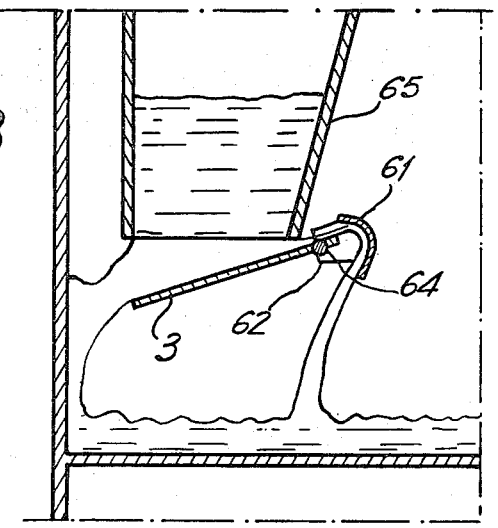
FIG. 33 is similar to FIGS. 27 and 30, and shows a deflector in the vicinity of the pivot axis of the valve

If this disadvantage is considered a serious one, one can, as shown in FIG. 33, provide a curved deflector or jet deviator 61 which is made integral, by means of gussets 62, with the flap 63 mounted for pivoting about an axis 64 carried by the downcomer 65. Due to the deflector 61 the liquid issuing in that region is thrown back towards the entry of the tray.

Figure 34:
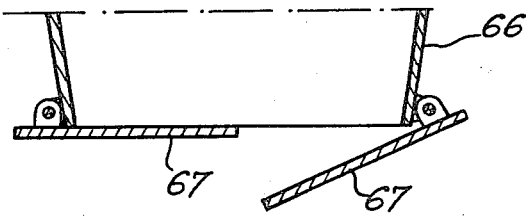
FIGS. 34 and 35 are diagrammatic sections of two different forms of overflows having flaps in the form of window leaves.
Figure 35:
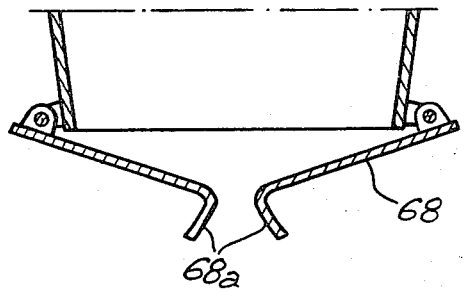

Experience shows that a central downcomer such as the downcomer 66 illustrated in FIG. 34 and provided with two symmetrical flaps 67 (the counter-weights whereof are not shown) tends to open only at one side. The outflow of liquid thus assumes a horizontal component of speed instead of falling vertically. An inequality of operation results which it is sometimes desirable to remedy. This can be achieved, as is shown in FIG. 35, by equipping the flap valve 68 with a substantially vertical and downwardly directed flange. When one of the flap valves opens the friction of the liquid brings about opening of the other. The vertical flange may have a height which represents a major fraction of the opening of the flap valve. Here too the counter-weights are not shown, for the purpose of simplifying.

Figure 36:
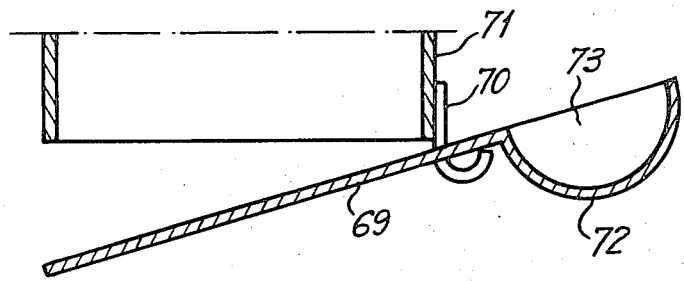
FIGS. 36 and 37 are similar to FIGS. 34 and 35, and show flap valves having hydraulic counter-weights.

FIG. 36 illustrates a flap valve with a hydraulic counter-weight in the form of a reservoir for liquid. The flap valve 69 is mounted so as to pivot on the hooks 70 which are supported by the downcomer 71. The valve flap extends beyond its pivot axis by a dish or gutter 72, formed to define two flanks 73 at its ends.

Figure 37:
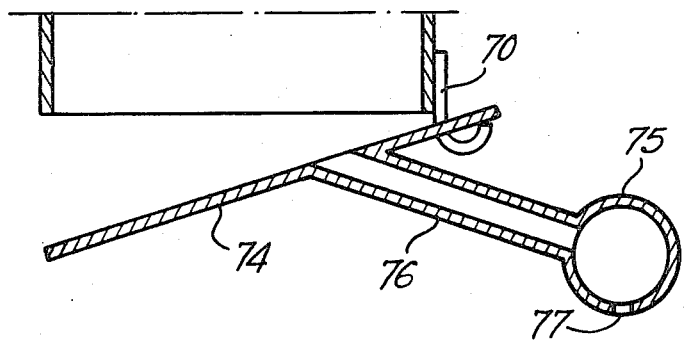

Such a valve operates unless it is subjected to rapid or sudden movements, such movements being, in fact, accompanied by the risk of the reservoir emptying abruptly. In order to eliminate this risk one can, as is shown in FIG. 37, combine with a flap valve 74 a closed reservoir 75 intended to be supplied via one or more tubes 76 which originate at the flap valve and may at the same time serve to support the said reservoir. At the lower portion of the reservoir there is provided an orifice 77 of smaller section than that of the tube 76 or the assembly of tubes 76, so as to permit the liquid in the reservoir to adjusted. Instead of being pivotably mounted by means of hooks 70 the flaps 69 and 74 of FIGS. 12 and 13 can be mounted by means of articulation axes as in the case of FIGS. 33 to 35.

In the case of FIG. 36 an orifice comparable to the orifice 77 is not necessary since there is constant replenishment of liquid through overflow from another downcomer.

Figure 38:
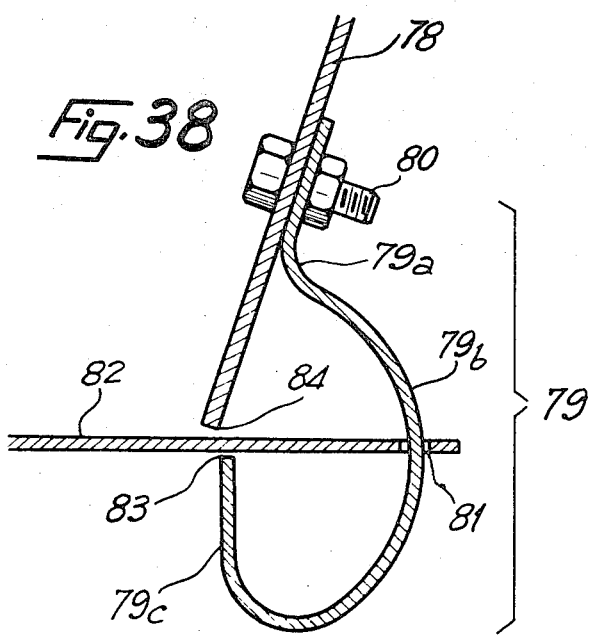
FIG. 38 is similar to FIGS. 14 to 16, and illustrates a hook linkage between a flap valve and a downcomer.

According to FIG. 38 the inner wall 78 of the downcomer carries at least two hooks or straps such as 79, secured by any suitable means, for example bolts 80. These straps are threaded through clearances 81 of the flap valve 82 before being attached to the downcomer 78. Each of the straps comprises a straight portion adhereing to the downcomer 78 and a bent portion 79a followed by a semicircular portion 79b the centre whereof is substantially on the edge 83 and which ends in a substantially vertical portion 79c. The left surface of the portion 79c ends in an edge 83 substantially vertically of the lower right edge 84 of the downcomer 78.

In operation the flap valve 82 thus pivots in practice about the edge 83 without increasing the free space between the flap 82 and the edge 84.

We claim:
1. A downcomer comprising
   a body portion having an opening in the lower part thereof, and
   a pivotally supported flap portion for controlling the opening in the body portion
   wherein one of said portions has an aperture therethrough and bracketed means fast with the other of said portions comprising a curved portion passing through said aperture for pivotally supporting said flap portion.
2. The downcomer of claim 1 wherein a hook is made fast with said body portion, said hook having an upper edge substantially in the vertical plane passing through the lower edge of said body portion.

* * * * *